United States Patent
Redmond et al.

(10) Patent No.: US 12,469,183 B2
(45) Date of Patent: Nov. 11, 2025

(54) TAG-TO-IMAGE STATUS IMAGE GENERATION

(71) Applicant: Schneider Electric Systems USA, Inc., Foxborough, MA (US)

(72) Inventors: James Redmond, Richmond (CA); Zackery Sobin, Raleigh, NC (US)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 282 days.

(21) Appl. No.: 18/135,230

(22) Filed: Apr. 17, 2023

(65) Prior Publication Data

US 2024/0346710 A1    Oct. 17, 2024

(51) Int. Cl.
*G06T 11/00* (2006.01)
*G05B 23/02* (2006.01)

(52) U.S. Cl.
CPC .......... *G06T 11/00* (2013.01); *G05B 23/0216* (2013.01)

(58) Field of Classification Search
None
See application file for complete search history.

(56) References Cited

U.S. PATENT DOCUMENTS

| | | | |
|---|---|---|---|
| 2008/0094401 A1* | 4/2008 | Lee | G06T 13/00 345/473 |
| 2015/0268830 A1* | 9/2015 | Martynov | G06F 3/04842 715/766 |
| 2017/0171315 A1* | 6/2017 | Mcnab | H04W 4/38 |
| 2019/0218153 A1* | 7/2019 | Price | C05F 17/05 |
| 2022/0025611 A1* | 1/2022 | Kandula | G06F 3/016 |
| 2022/0027529 A1 | 1/2022 | Zarur et al. | |
| 2022/0197272 A1 | 6/2022 | Sinha et al. | |
| 2022/0297170 A1* | 9/2022 | Tsao | H01L 21/67727 |

OTHER PUBLICATIONS

Extended European Search Report from EP Application No. 24168918. 1, dated Oct. 14, 2024, 9 pages.

* cited by examiner

*Primary Examiner* — Kyle Zhai
(74) *Attorney, Agent, or Firm* — Stinson LLP

(57) ABSTRACT

An image generation processor of an automation system executes a tag-to-image tool for visualizing status information associated with an industrial operation. A SCADA server monitors telemetry data from a remote industrial asset and provides supervisory control via a private network. The SCADA server also stores textual status information relating to the industrial operation in one or more tags. The image generation processor executes the tag-to-image tool to automatically generate at least one visual indicator representative of the textual status information stored in the tags and causes the generated visual indicator to be dynamically displayed on a display of a client display device associated with the industrial operation.

19 Claims, 4 Drawing Sheets

TAG-TO-IMAGE STATUS IMAGE GENERATION

BACKGROUND

In a typical industrial automation system, a Supervisory Control and Data Acquisition (SCADA) system communicates with many industrial assets, including smart devices (e.g., remote terminal units and programmable logic controllers). These devices provide remote industrial or resource monitoring and control and are configured for use in a particular application (e.g., oil and gas, water and waste water, renewable energy). For example, a data radio or other remote wireless terminal coupled to a remote device transmits telemetry data to the SCADA system and receives messages back for controlling operations via a private data radio network and/or a cellular telephone network.

Tags are a common form of variables for SCADA automation and can be used to store date and time data, sensor readings, device names, device properties, engineering units, alarm limits, etc. For example, tags are used to identify and categorize equipment in an industrial automation system. They may also be used to receive values from remote devices and send commands and set points to the devices. A unique name, such as a number and text, is given to each tag so it can be configured, stored, and referenced.

SUMMARY

Aspects of the present disclosure permit applying text information provided by one or more tags to a tag-to-image generation tool to automatically generate an image describing the current status of the operations of a site based on the text-based tag information.

In an aspect, an automation system controlling an industrial operation comprises a SCADA server and at least one remote industrial asset coupled to the SCADA server via a private network. The SCADA server is configured to monitor telemetry data from the remote industrial asset and provide supervisory control via the private network. The SCADA server also stores textual status information relating to the industrial operation in one or more tags. The system includes an image generation processor and a memory device storing computer-executable instructions. When the image generation processor executes the computer-executable instructions, they configure it for executing a tag-to-image tool. The tag-to-image tool automatically generates at least one visual indicator representative of the textual status information stored in the received tags and causes the generated visual indicator to be dynamically displayed on a display of a client display device.

In another aspect, a method visualizes status information associated with an industrial operation controlled by an automation system. The automation system comprises a SCADA server and at least one remote industrial asset coupled to the SCADA server via a private network. The SCADA server is configured to monitor telemetry data from the remote industrial asset and provide supervisory control via the private network. The method comprises receiving, by an image generation processor, one or more tags, which stored textual status information relating to the industrial operation. The method further comprises automatically generating, by a tag-to-image tool, at least one visual indicator representative of the textual status information stored in the received tags and dynamically displaying the generated visual indicator on a display of a client display device.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
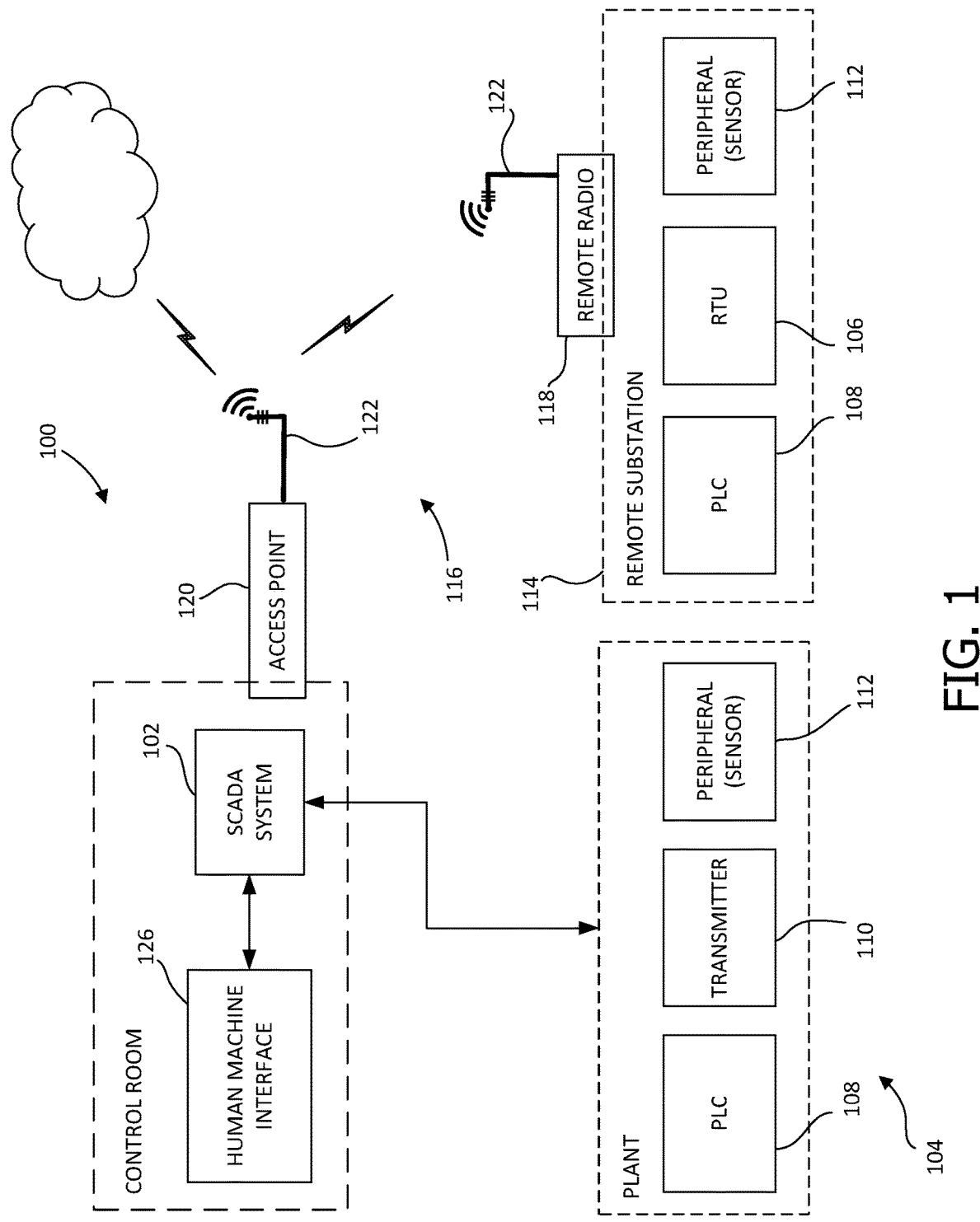
FIG. 1 illustrates an automation system according to an embodiment.

Aspects of the present disclosure relate to the collection of text information provided by tags relating to alarms, status messages, faults, I/O values, etc. in an industrial automation system. Referring to FIG. 1, a schematic overview of an automation system according to one embodiment is generally indicated 100. The automation system 100 includes a Supervisory Control and Data Acquisition (SCADA) system 102 communicating with one or more industrial assets, generally indicated 104. In the illustrated embodiment, the industrial assets 104 include one or more industrial control and monitoring devices, such as a remote terminal unit (RTU) 106, a programmable logic controller (PLC) 108, a multivariable transmitter (MVT) 110, and a peripheral 112 (e.g., sensor, actuator, variable frequency drive, motor controller, pressure transmitter, Coriolis meter, magnetic flow meter, cell modem, etc.). In another embodiment, asset 104 comprises a computing device, edge computer, or similar edge device.

The SCADA system 102 of FIG. 1 is coupled to a remote substation 114 via a communications network 116, such as a private data radio network and/or a cellular telephone network. In the illustrated embodiment, the remote substation 114 and the SCADA system 102 communicate with each other via the private data radio network 116, which includes a plurality of remote radios 118 associated with one or more remote substations 114 and a base station, or access point, 120 associated with SCADA system 102. The data radios 118 and the access point 120 each have an associated antenna 122 for communicating on the network 116. The substation 114 typically includes a number of peripherals 112 and at least one RTU 106 for data acquisition from substation 114 and/or from SCADA system 102. The RTU 106 transmits telemetry data to SCADA system 102 and receives messages from SCADA system 102 for controlling connected physical objects of remote substation 114. Suitable data radios for use as remote radio 118 and/or access point 120 are Trio licensed Ethernet and serial data radios available from Schneider Electric. These UHF data radios provide serial and Ethernet connectivity for long range wireless data communications in a wide range of SCADA and telemetry applications.

In addition to the RTU 106, peripherals 112, and other components of remote substation 114, the SCADA system 102 in the illustrated embodiment communicates with at least one PLC 108. In a SCADA-based control system, PLC 108 is connected to, for example, a sensor (i.e., peripheral 112) for collecting the sensor output signals and converting the signals into digital data. The SCADA system 102 may also communicate with a multivariable transmitter, such as MVT 110, which is used to measure flow, differential pressure, temperature, pressure, or the like. The various assets 104, including RTU 106, PLC 108, MVT 110, and/or peripheral 112, communicate with SCADA system 102 according to different protocols (e.g., DNP3, Modbus, IEC-104). The automation system 100, including data radios 118, may be an electrical grid automation system, a water grid network monitoring system, or the like.

As shown in FIG. 1, SCADA system 102 operates in conjunction with a human-machine interface (HMI) 126. The HMI 126 is an input-output device that presents process information to a human operator. The SCADA system 102 links to HMI 126 for providing maintenance procedures, detailed schematics, logistic information, trend data, diagnostic data, configuration data transfer, and the like for a specific sensor or machine. In an embodiment, HMI 126 comprises a personal computer, smartphone, tablet, touch-screen HMI device, or the like. Although illustrated in a control room remotely from the various industrial assets 104, it is to be understood that HMI 126 could be hosted on the device itself.

Figure 2:
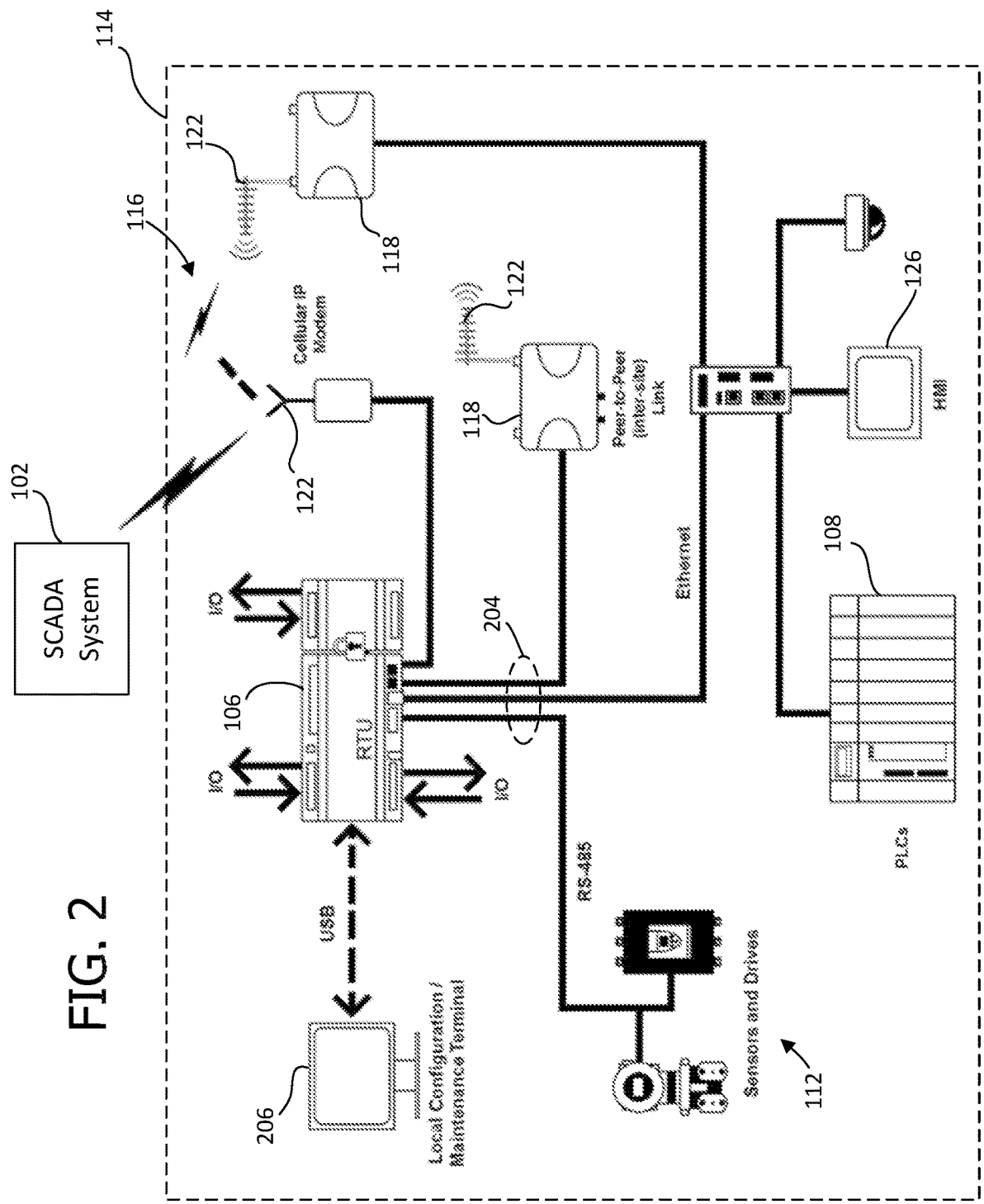
FIG. 2 is a block diagram of a remote substation of the automation system of FIG. 1.

In an embodiment, the RTU 106 is used as a control device as shown in FIG. 2. A communication bus 204 provides communication for the complete substation 114 and all parts of the substation are accordingly connected thereto, whether directly or indirectly. The RTU 106 is configured to be connected to a computer 206 (e.g., a personal computer, desktop, laptop, workstation machine, etc.) of SCADA system 102 to access and control settings and parameters as well as a real-time database.

Figure 3:
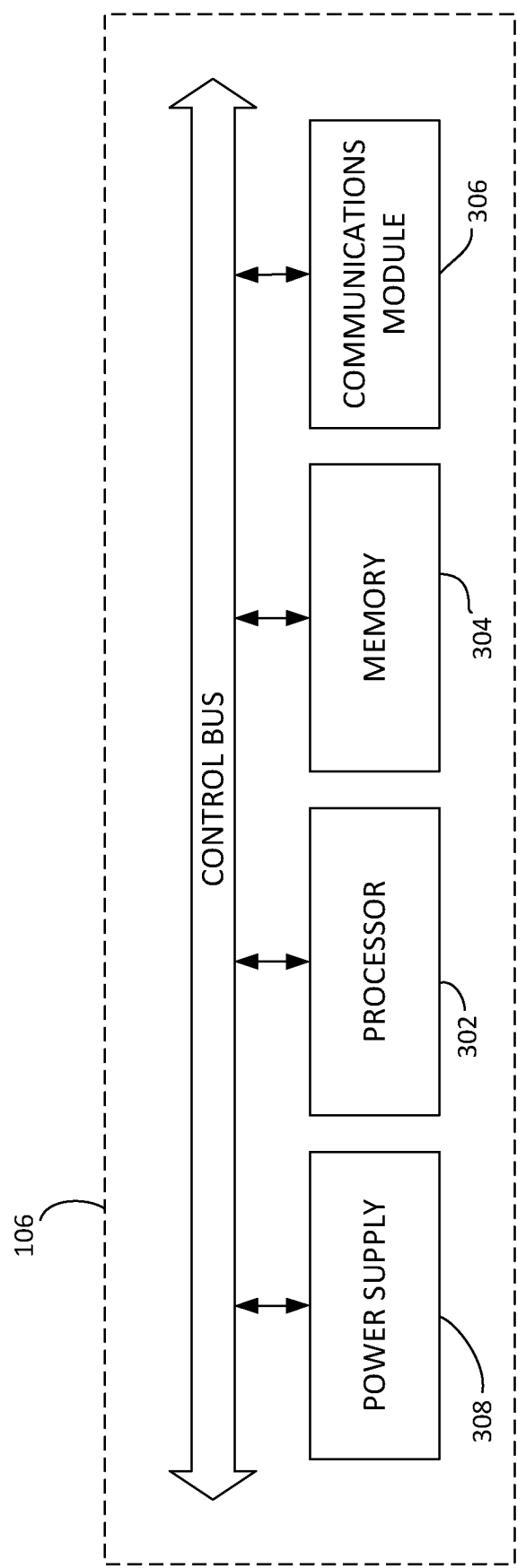
FIG. 3 is a block diagram of a remote terminal unit (RTU) of the remote substation of FIG. 2.

FIG. 3 illustrates RTU 106, including its major components. As shown, the RTU 106 includes a processor, or central processing unit (CPU), 302, which is the controller module of RTU 106. In addition, RTU 106 includes a memory 304 (e.g., volatile and non-volatile), and a communications module 306 all coupled to a power supply module 308. In an embodiment, the communications module 306 includes a serial port or onboard modem with an I/O (input/output) interface. The RTU 106 is configured to be interfaced to multiple control stations and intelligent electronic devices using different communication media such as RS485, RS232, Ethernet, microwave, satellite, etc. When a communication interface is established, either device can initiate the data transfer. In addition, RTU 106 may include one or more digital input modules providing a plurality of digital inputs, one or more digital output modules providing a plurality of digital outputs, one or more analog input modules providing a plurality of analog inputs, and one or more analog output modules providing a plurality of analog outputs.

As described above, industrial automation systems, such as system 100, typically include many industrial assets 104 executing many applications. When the description herein refers to an example in which the industrial asset 104 comprises RTU 106, it is to be understood that aspects of the present disclosure may also be implemented in other assets 104 of SCADA system 102.

Figure 4:
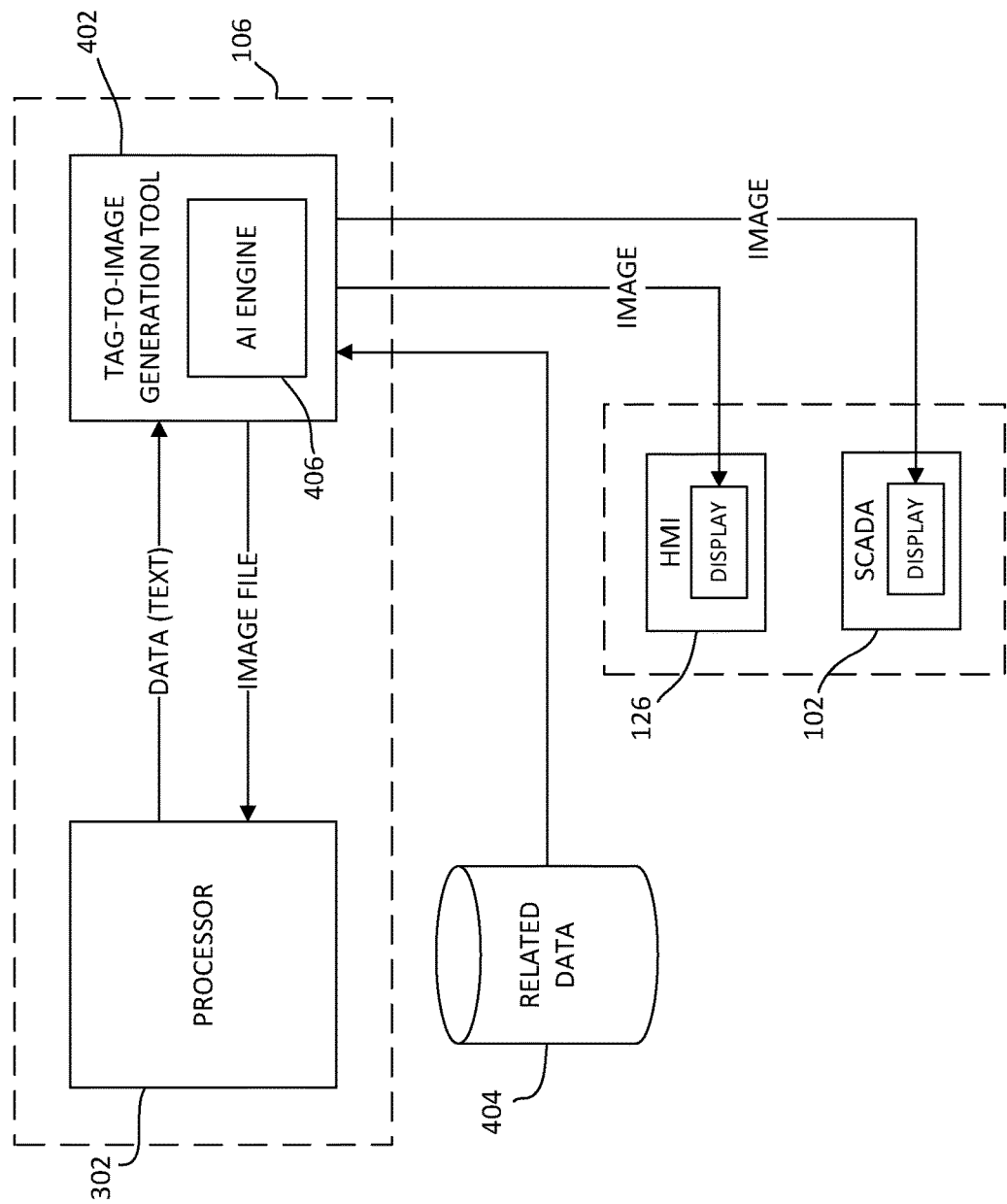
FIG. 4 is a block diagram of a tag-to-image tool for use with the automation system of FIG. 1.

Aspects of the present disclosure relate to the collection of text information provided by tags relating to alarms, status messages, faults, I/O values, etc. The tags correspond to various status parameters associated with operations on a site (e.g., remote substation 114) that is monitored or controlled by a microcomputer (e.g., computer 206 or RTU 106 of remote substation 114). In the example of FIG. 4, the processor 302 of RTU 106 comprises an image generation processor configured to execute a tag-to-image tool 402, which may be embodied as computer-executable instructions stored in memory 304. Text information from each tag is applied to the tag-to-image tool 402 to automatically generate a visual indicator representing the current status of the operations of the industrial site. The visual indicator may be a static or dynamic image or an animation.

In an embodiment, tag-to-image tool 402 accesses information from a database 404 to determine suitable visual indicators representative of a text-based tag. The accessed information, indicated as related data stored in the database 404, includes images and other information relating to assets 104. In an embodiment, the status visual indicators are developed for the site automatically during the development process and used as the basis for rapid development of perfected images by a developer who tunes them. The developer who tunes the image library will validate the industry-specific tags correspond to the industry-specific meaning; for example, this would validate, for a water wastewater application, that a pump shows a water pump whereas for an oil and gas application a pump would show an item such as pumpjack. The tag tuning can also be done for a specific deployment. For instance, the developer can tune for images specific to the site, organization, national standards, and other factors. The visual indicators may be used directly without a human review after being generated by tag-to-image tool 402.

It is to be understood that an edge PC (e.g., computer 206) or other edge device (e.g., data radio 118 or a cell modem, access point 120, RTU 106, PLC 108, or another asset 104) comprises the image generation processor configured to execute tag-to-image tool 402. In an alternative embodiment, the tag-to-image tool 402 is executed by computer 206 or hosted in the cloud or at an on-premise server. For the sake of convenience, however, the description herein refers to an example in which the processor 302 of RTU 106 comprises the image generation processor configured to execute tag-to-image tool 402.

According to aspects of the present disclosure, processor 302 employs machine learning (ML) to generate the visual indicators representing the text-based tags. In an embodiment, RTU 106 comprises processor 302 coupled to memory device 304, which stores computer-executable instructions, including reinforced machine learning algorithms. The associated computer-executable instructions executed by processor 302 comprise artificial intelligence (AI) engine 406 in FIG. 4. When executed, the instructions configure the AI engine 406 to execute the tag-to-image tool 402 for automatically generating a visual indicator representative of the text tag. In one example of an alternative embodiment, an application or service hosted on the web or in the cloud or on a server comprises the AI engine 406 executing the tag-to-image tool 402.

In an embodiment, a microprocessor device, namely, processor 302 of RTU 106, monitors operational conditions (e.g., pressure sensors, flow meters, and digital inputs, including inputs pressure switches, vibration switches, etc.) from one or more sensors (i.e., peripherals 112). The processor 302 performs calculations using the information provided by the sensors (or other devices). The processor 302 also reports a sequence of tags and the text associated with the tags. This text can be assembled into one statement, such as "high tubing pressure alarm $CO_2$ at Princess 125 site compressor." The processor 302 then interfaces with an application programming interface (API) of tag-to-image tool 402 to generate an image or the like corresponding to the text provided by the microprocessor device. It is contemplated that the API resides on the device (e.g., RTU 106) or in the cloud. The AI engine 406 of tag-to-image tool 402 is configured to retrieve additional information from the external database 404 that the AI engine 406 can draw from for generating the visual indicators. Examples of the additional data stored in database 404 include actual images of assets 104 at a particular site. Once the visual indicator has been generated, the file is displayed as directed by the system design (e.g., via HMI 126 or SCADA system 102) or otherwise communicated to operators directly (e.g., by email, short message service message, etc.) as an alarm. Alternatively, the microprocessor device is embodied by edge PC 206, PLC 108, or another computing device of automation system 100.

By automatically generating status visual indicators, a graphical representation of the site can be assembled corresponding to the unique situation of the current operational condition of the particular site in that moment. The benefits of this include a description of what the status is for operators who may not be literate in the language used in the development of a typical HMI 126. This is a problem in countries outside the United States, such as Oman, Indonesia, India, and Brazil, and where the workforce is illiterate or semi-literate or where the workforce has a native language other than the language of the system's HMI.

In addition, aspects of the present disclosure permit generating a bespoke set of visual indicators for an application and/or site for display by HMI 126 or SCADA system 102. An automated tool (e.g., tag-to-image tool 402) generates the visual indicators automatically during the development of the system 100. The auto-generated visual indicators can be refined or tuned by a human engineer or developer to enable much more rapid and specific HMI information for each site. The benefit of this is to reduce the engineering effort required to produce an HMI for an automation system.

The SCADA system 102, including RTU 106, is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 106 in an oil and gas application, for example, include: tank monitoring and automation; well test automation; Emergency Shut-Down (ESD) at well heads; well production and optimization; and measurement.

In an oil and gas environment, for example, substation 114 is located at a well site to gather data about various aspects of the well site for monitoring and tracking purposes. The substation 114, which acts as a control unit, includes RTU 106 for collecting data on pump motor operation (e.g., motor speed and load). A variable speed drive motor controller, for example, generates this motor data. The RTU 106 also collects measurements from various wireless and wired field sensors (i.e., peripherals 112) around the well site. These field sensors include a proximity sensor mounted near the crank arm of a rod pump assembly and a load cell mounted between the bridle and polished rod of the rod pump assembly. From this data, RTU 106 can determine the tension or load (vertical axis) on the rod versus the displacement (horizontal axis) of the rod per stroke or pump cycle (i.e., upward and downward movement). Other data collected by RTU 106 from the field sensors may include fluid flow rate, temperature, pressure, and the like.

In an embodiment, RTU 106 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 106 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU 106 embodying aspects of the present disclosure involves electrical applications such as wind, solar, transformer stations, etc. Diversification of energy production resources require utility operators to manage a much wider portfolio of assets. Moreover, assets such as wind turbines and solar cells are often located in harsh, remote environments. In an embodiment, RTU 106 monitors active and reactive power, phase voltage, connection status of switches, and the like.

Yet another use case for the RTU 106 embodying aspects of the present disclosure involves autonomous, remotely located assets 104, including critical infrastructure assets, where high control system, monitoring, and reporting availability as well as data analytics associated with control systems, asset performance, and custom application features are requested.

In operation, a method for visualizing relevant status information associated with an industrial operation embodying aspects of the present disclosure includes receiving, on a hardware device such as RTU 106, sensor data from one or more sensors 112 associated with the industrial operation. The sensors 112 are configured to collect various data associated with assets 104 and other equipment associated with the industrial operation and provide the collected data in the form of the sensor data. A processor (e.g., processor 302) of the hardware device processes the sensor data to generate tags corresponding to various status parameters associated with the industrial operation. The tags include textual information extracted, derived, or learned from an analysis of the sensor data. The method further comprises providing the tags to tag-to-image tool 402 to generate visual indicators (e.g., static or dynamic images) illustrating the current status of the industrial operation, as learned from the various status parameters, and dynamically displaying the visual indicators on a display of a client display device (e.g., HMI 126). The display includes imagery representative of the industrial operation, wherein the current status of the industrial operation is indicated by the visual indicators. In an embodiment, the visual indicators are overlaid on the imagery representative of the industrial operation. At least one of the visual indicators may take the form of an animation. Aspects of the present disclosure also include receiving manually generated tags corresponding to various status parameters associated with the industrial operation from system operators, providing the manually generated tags to the tag-to-image tool 402 to generate the visual indicators, and dynamically displaying the visual indicators on the display of the client display device. The visual indicators may also be communicated by email, short message service (SMS), and/or multimedia message service (MMS) messages.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. An automation system controlling an industrial operation, the system comprising:
 a Supervisory Control and Data Acquisition (SCADA) server;
 at least one remote industrial asset coupled to the SCADA server via a communications network, the SCADA server configured to monitor telemetry data from the remote industrial asset and provide supervisory control via the communications network, the SCADA server storing textual status information relating to the industrial operation in one or more tags;

an image generation processor receiving and responsive to the tags;

a memory device storing computer-executable instructions that, when executed by the image generation processor, configure the image generation processor for executing a tag-to-image tool to:

automatically generate at least one visual indicator representative of the textual status information stored in the received tags; and cause the generated visual indicator to be dynamically displayed on a display of a client display device, wherein the tag-to-image tool comprises an artificial intelligence (AI) engine, and wherein the AI engine comprises a predictive model trained by manually generated tags corresponding to various status parameters associated with the industrial operation.

2. The system of claim 1, wherein the client display device comprises at least one of a human-machine interface and the SCADA server.

3. The system of claim 1, further comprising one or more sensors configured to output sensor data associated with the industrial operation, wherein the textual status information is representative of the sensor data.

4. The system of claim 1, further comprising an image database storing information relating to a designated site of the industrial operation.

5. The system of claim 4, wherein the computer-executable instructions, when executed by the image generation processor, further configure the image generation processor for executing the tag-to-image tool to:

retrieve information relating to the designated site from the image database; and correlate the retrieved information with the generated visual indicator.

6. The system of claim 1, wherein the computer-executable instructions, when executed by the image generation processor, further configure the image generation processor for executing the tag-to-image tool to:

assemble the textual status information stored in a plurality of the tags; and automatically generate the visual indicator representative of the assembled textual status information.

7. The system of claim 1, wherein the visual indicator is displayed on the client display device overlaid on imagery representative of the industrial operation.

8. The system of claim 1, wherein the visual indicator comprises at least one of a static image, a dynamic image, and an animation.

9. The system of claim 1, wherein the remote industrial asset comprises the image generation processor.

10. The system of claim 1, wherein the remote industrial asset includes at least one of: a remote terminal unit (RTU), a programmable logic controller (PLC), a multivariable transmitter (MVT), a sensor, and a computing device.

11. The method of claim 1, wherein the remote industrial asset comprises the image generation processor.

12. A method of visualizing status information associated with an industrial operation controlled by an automation system, the automation system comprising a Supervisory Control and Data Acquisition (SCADA) server and at least one remote industrial asset coupled to the SCADA server via a communications network, the SCADA server configured to monitor telemetry data from the remote industrial asset and provide supervisory control via the communications network, the method comprising:

receiving, by an image generation processor, one or more tags, the tags storing textual status information relating to the industrial operation;

automatically generating, by a tag-to-image tool, at least one visual indicator representative of the textual status information stored in the received tags; and causing the generated visual indicator to be dynamically displayed on a display of a client display device, wherein the tag-to-image tool comprises an artificial intelligence (AI) engine, and wherein automatically generating the visual indicator comprises executing, by the AI engine, a predictive model trained by manually generated tags corresponding to various status parameters associated with the industrial operation.

13. The method of claim 12, further comprising:

storing information relating to a designated site of the industrial operation in an image database;

retrieving information relating to the designated site from the image database; and correlating the retrieved information with the generated visual indicator.

14. The method of claim 12, further comprising:

assembling the textual status information stored in a plurality of the tags; and automatically generating the visual indicator representative of the assembled textual status information.

15. The method of claim 12, wherein dynamically displaying the generated visual indicator comprises overlaying the visual indicator on imagery representative of the industrial operation.

16. The method of claim 12, wherein the visual indicator comprises at least one of a static image, a dynamic image, and an animation.

17. The method of claim 12, further comprising:

receiving manually generated tags corresponding to various status parameters associated with the industrial operation;

providing the manually generated tags to the tag-to-image tool to generate the visual indicator.

18. The method of claim 12, further comprising communicating the visual indicators by at least one of an electronic mail, a short message service (SMS) message, and a multimedia message service (MMS) message.

19. The method of claim 12, further comprising refining the generated visual indicator specific to conditions at a designated site of the industrial operation.

* * * * *